No. 803,024. PATENTED OCT. 31, 1905.
J. R. STEITZ.
WHEEL AND AXLE CLUTCH MECHANISM.
APPLICATION FILED AUG. 10, 1904.
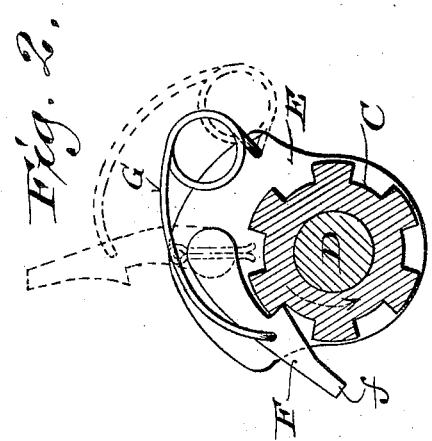
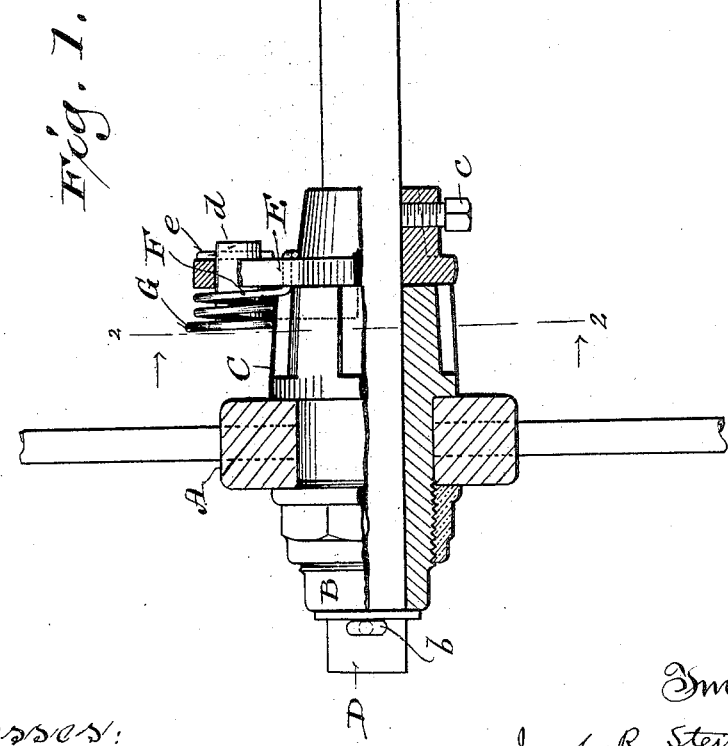

UNITED STATES PATENT OFFICE.

JACOB R. STEITZ, OF LAKE, WISCONSIN.

WHEEL AND AXLE CLUTCH MECHANISM.

No. 803,024.　　　Specification of Letters Patent.　　　Patented Oct. 31, 1905.

Application filed August 10, 1904. Serial No. 220,172.

*To all whom it may concern:*

Be it known that I, JACOB R. STEITZ, a citizen of the United States, and a resident of the town of Lake, in the county of Milwaukee and State of Wisconsin, have invented certain new and useful Improvements in Wheel and Axle Clutch Mechanism; and I do hereby declare that the following is a full, clear, and exact description thereof.

The invention was originally disclosed in my application for patent for improvements in potato-planters, filed September 15, 1903, Serial No. 173,232, patented January 31, 1904, No. 781,310; and it consists in certain peculiarities of construction and combination of parts hereinafter particularly set forth with reference to the accompanying drawings and subsequently claimed, the object of said invention being to provide simple, economical, and efficient means for putting a traction-wheel in and out of clutch connection with a driving-axle.

Figure 1 of the drawings represents a partly-sectional elevation of an assemblage of parts, including a fragment of a traction-wheel, a fragment of a driving-axle engaging the wheel-hub, and means in accordance with my invention by which the wheel and axle are put in and out of slip-clutch connection; and Fig. 2, a sectional view on the plane indicated by line 2 2 in Fig. 1, one position of a pawl and controlling-spring for the same being shown by full lines and another position by dotted lines.

Referring by letter to the drawings, A indicates a fragment of a traction-wheel, the hub of which is clamped on a sleeve B, that has a ratchet extension C, and D indicates a fragment of a driving-axle engaging said sleeve, a linchpin $b$ or other suitable means being employed to hold the aforesaid sleeve on the axle against a bracket E, that is made fast to said axle by a set-screw $c$ or otherwise. In pivotal connection with the bracket is a pawl F for the ratchet extension C of the wheel-hub sleeve B, the pivot being preferably a stud $d$, integral with the pawl, and the axle-bracket is provided with an aperture for the engagement of the stud, a split-spring key $e$ being employed in an eye of said stud to maintain the same in its connection with said bracket. One end of a sufficiently stiff spring G is in engagement with the axle-bracket, and the other end of this spring is fastened to the pawl. When the pawl is engaged with the ratchet extension of the sleeve of the wheel-hub, the axle turns with the wheel in the direction of the arrow displayed in Fig. 2, said wheel being then on its forward movement; but if there be reverse movement of the aforesaid wheel said sleeve will slip on said axle, the latter being then at rest, provided the other traction-wheel thereon is loose. There being two traction-wheels, each in clutch with an axle by the means above specified, and one wheel traveling forward faster than the other, the slow wheel will slip on said axle. The arrangement of the spring-controlled pawl is such that it can be easily thrown out of engagement with the corresponding ratchet by hand, the tension of the spring being overcome by the swing of said spring on its pivot end in loose engagement with the axle-bracket, said spring then serving in its new position to hold said pawl out of clutch with said ratchet. The disengagement of the pawl from the ratchet being effected, the wheel of which said ratchet forms a part is free to rotate independent of its axle. To facilitate throwing the spring-controlled pawl in and out of engagement with the adjacent ratchet, the clutch end of said pawl is extended to form a handle $f$, as shown in Fig. 2.

The construction of the traction-wheel may be varied indefinitely, provided the hub of same has a ratchet extension for the engagement of a pawl in pivotal and spring connection with a bracket that is made fast to the axle on which said wheel is free to turn when said pawl is clear of its ratchet.

Having thus described my invention, what I claim as new, and desire to secure by Letters Patent, is—

1. The combination of a wheel having the hub thereof provided with a ratchet extension, an axle with which the wheel has slip engagement, a bracket fast on the axle, a pawl in pivotal connection with the bracket to be swung in and out of engagement with the wheel-hub, and a spring connected at its ends to said bracket and pawl to hold the latter in and out of working position.

2. The combination of a wheel having the hub thereof provided with a ratchet extension, an axle with which the wheel has slip engagement, a bracket fast on the axle, a pawl having a pivot-stud held to turn in an aperture in the bracket, this pawl being swung in or out of engagement with said ratchet extension of the wheel-hub; and a spring connected at its ends to said bracket and pawl to hold the latter in and out of working position.

3. The combination of a sleeve having a ratchet extension, a wheel rigid on the sleeve, an axle with which the sleeve has slip engagement, a bracket fast on the axle, a pawl in pivotal connection with the bracket, to be swung in and out of engagement with the ratchet extension of said sleeve, and a spring connected at its ends to said bracket and pawl to hold the latter in and out of working position.

In testimony that I claim the foregoing I have hereunto set my hand, at Milwaukee, in the county of Milwaukee and State of Wisconsin, in the presence of two witnesses.

JACOB R. STEITZ.

Witnesses:
N. E. OLIPHANT,
GEO. FELBER.